United States Patent [19]
Bray et al.

[11] Patent Number: 5,298,166
[45] Date of Patent: Mar. 29, 1994

[54] METHOD FOR AQUEOUS RADIOACTIVE WASTE TREATMENT

[75] Inventors: Lane A. Bray; Leland L. Burger, both of Richland, Wash.

[73] Assignee: Battelle Memorial Institute, Richland, Wash.

[21] Appl. No.: 775,165

[22] Filed: Oct. 11, 1991

[51] Int. Cl.$^5$ .............................................. C02F 1/42
[52] U.S. Cl. ................... 210/679; 210/682; 210/751; 252/628; 252/631; 588/257
[58] Field of Search .................. 210/679, 682, 751; 252/628, 631; 588/257

[56] References Cited

PUBLICATIONS

Lynch, R. W., R. G. Dosch, B. T. Kenna, J. K. Johnstone, and E. J. Nowak, 1975, *The Sandia Solidification Process-A Broad Range Aqueous Waste Solidification Method*, IAEA-SM-207175, Sandia Laboratories, Albuquerque, NM.
Dosch, R. G. 1978, *The Use of Titanates in Decontamination of Defense Wastes*, SAND78-0710, Sandia Laboratories, Albuquerque, NM.
Schulz, W. W. 1978, *Decontamination of Hanford Plutonium Reclamation Facility Salt Waste Solution*, RHO–SA-23, Rockwell Hanford Operations, Richland, Wash.
Bray, L. A., L. K. Holton, T. R. Myers, G. M. Richardson, and B. M. Wise, 1084, *Experimental Data Developed to Support the Selection of a Treatment Process for West Valley Alkaline Supernatant*, PNL-4969, Pacific Northwest Laboratory, Richland, Wash.

*Primary Examiner*—Ivars Cintins
*Attorney, Agent, or Firm*—Joseph J. Hauth

[57] ABSTRACT

Plutonium, strontium, and cesium found in aqueous waste solutions resulting from nuclear fuel processing are removed by contacting the waste solutions with synthetic zeolite incorporating up to about 5 wt % titanium as sodium titanate in an ion exchange system. More than 99.9% of the plutonium, strontium, and cesium are removed from the waste solutions.

5 Claims, 3 Drawing Sheets

METHOD FOR AQUEOUS RADIOACTIVE WASTE TREATMENT

STATEMENT OF GOVERNMENT INTEREST

This invention was made with government support under contract number DE-AC06-76RLO 1830, awarded by the U.S. Department of Energy. The Government has certain rights in the invention.

FIELD OF THE INVENTION

This invention relates to treatment of alkaline waste and sludge wash solutions with titanium-treated zeolite to remove trace amounts of plutonium, strontium, and cesium.

BACKGROUND OF THE INVENTION

Commercial reprocessing of nuclear reactor fuels results in high-level waste (HLW) which is stored in tanks. The waste must be eventually removed from the tanks and solidified in a form suitable for transportation to a federal repository for final disposition.

The HLW in the tanks typically contains plutonium and other transuranic (TRU) elements in two fractions: an alkaline waste (supernatant) solution, and a sludge layer of iron hydroxide and fission product solids. This alkaline waste solution is first treated to remove $^{137}Cs$ by passing a water-diluted solution through a series of ion exchange columns containing aluminosilicate ion exchanger. The resulting effluent is mixed with concrete and stored as low-level waste (LLW).

The TRU content of alkaline supernatant waste stored in tanks at West Valley Nuclear Services Co. (hereinafter West Valley or WV) is approximately 49 nanocuries per gram (nCi/g), and after the above described treatment the content is about 21 nCi/g. It is desired to reduce the TRU content to 10 nCi/g or less. A proposed treatment process for the sludge fraction of stored HLW involves washing with at least 4 batch contacts of water to remove excess sodium sulfate, then to mix with glass formers and vitrify into a final HLW form. The sludge wash solutions will also be processed by ion exchange to recover $^{137}Cs$.

In previous studies, however, it was found that 20% of the plutonium and 95% of the uranium in the sludge transferred to the water phase during washing. These values were substantially reduced by washing with pH 12.5 water, but the plutonium content still represented about 5% of the soluble plutonium, exceeding the required maximum actinide content in the concrete waste form (<100 nCi/g of waste). A method for plutonium removal from sludge water washes was required.

The ion exchange process for recovery of $^{137}Cs$ at WV has utilized the inorganic ion exchanger IE-96, a synthetic zeolite available from UOP. This material has been used for cesium recovery because of its high ion exchange capacity and decontamination factor (DF) values (>40,000), and because it can be incorporated with glass formers and washed sludge to form borosilicate glass.

Previous studies by the inventors of the present invention showed that the IE-96 zeolite ion exchanger, when treated with a solution of titanium [4+] salt of isopropoxy [triethanolaminato] dissolved in isopropyl alcohol, extracts traces of plutonium from the WV alkaline wastes. However, use of this material has not been further considered based on safety considerations (volatile organics) and the need for a simple and reproducible large-scale preparation process.

SUMMARY OF THE INVENTION

We have found that the zeolite ion exchanger IE-96, treated with a titanium solution, is effective for removal of plutonium, strontium, and cesium from alkaline supernatant and sludge wash solution. The zeolite was treated with $TiCl_3$ to produce titanium loadings of up to 5.3 wt % $TiO_2$. Loading zeolite with $TiO_2$ in amounts greater than 5 wt % $TiO_2$ is possible, but the ability to co-load cesium becomes less effective with increasing Ti content. The titanium values were reported as $TiO_2$ for analytical purposes only. The loaded titanium is actually in the form of sodium titanate. Reduction of the plutonium content in the final concrete product to <1 nCi/g is projected, as compared with a value of about 1000 nCi Pu/g without titanium loading (A concentration of <100 nCi/g is required for non-TRU waste).

The titanium-loaded zeolite is prepared by loading IE-96 with $TiCl_3$ in aqueous solution, washing excess titanium from the zeolite, washing the zeolite with caustic (NaOH) to hydrolyze the titanium to sodium titanate, and drying the product. Titanium-treated zeolite ion exchanger is contacted with alkaline supernatant and sludge wash solutions in an ion exchange column or as a slurry to reduce the concentrations of plutonium, strontium, and cesium to acceptable levels.

DETAILED DESCRIPTION OF THE INVENTION

I. Preparation of Titanium-Treated Zeolite

Figure 1:
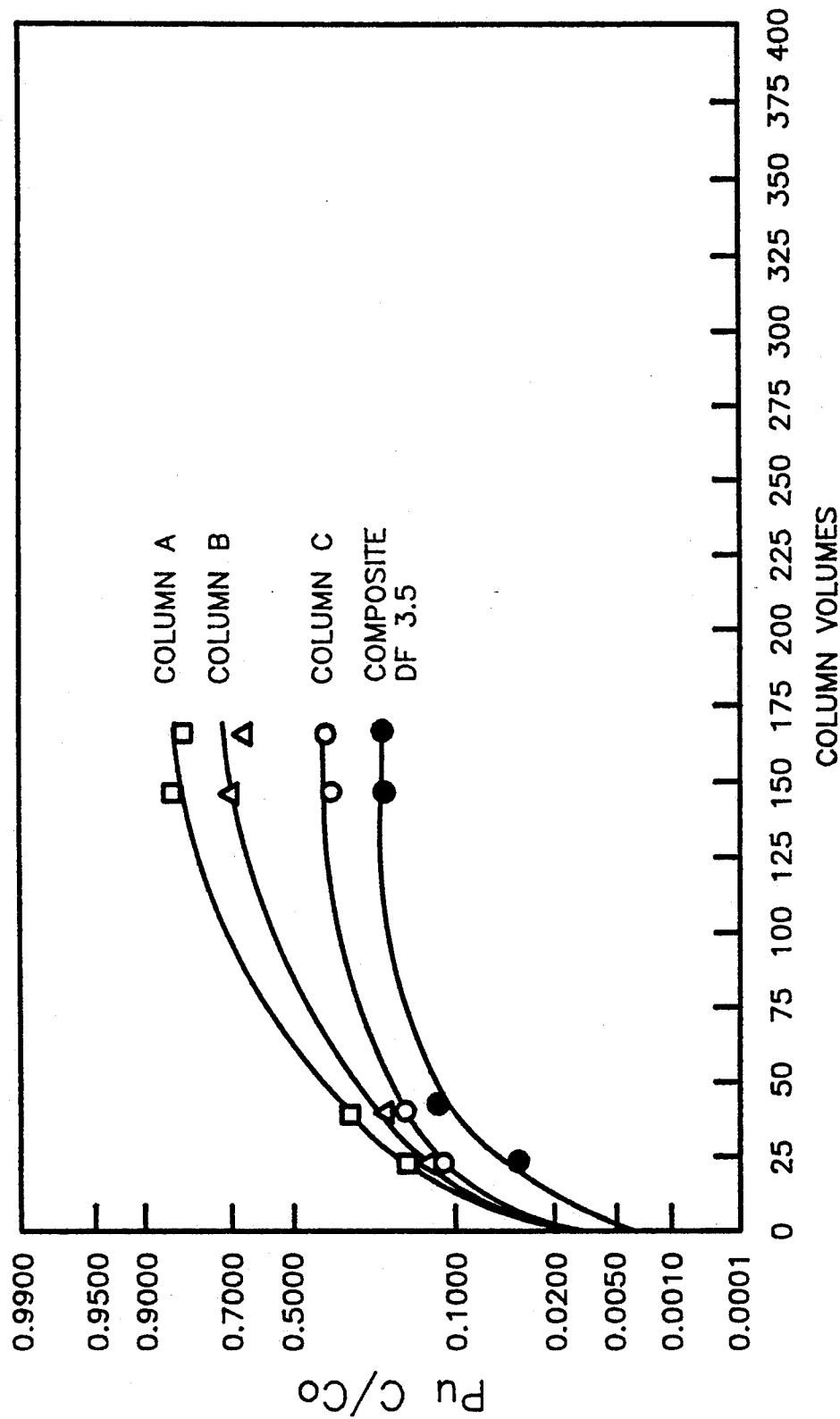
FIG. 1 is a graph showing recovery of plutonium from synthetic alkaline waste using untreated zeolite ion exchanger.
Figure 2:
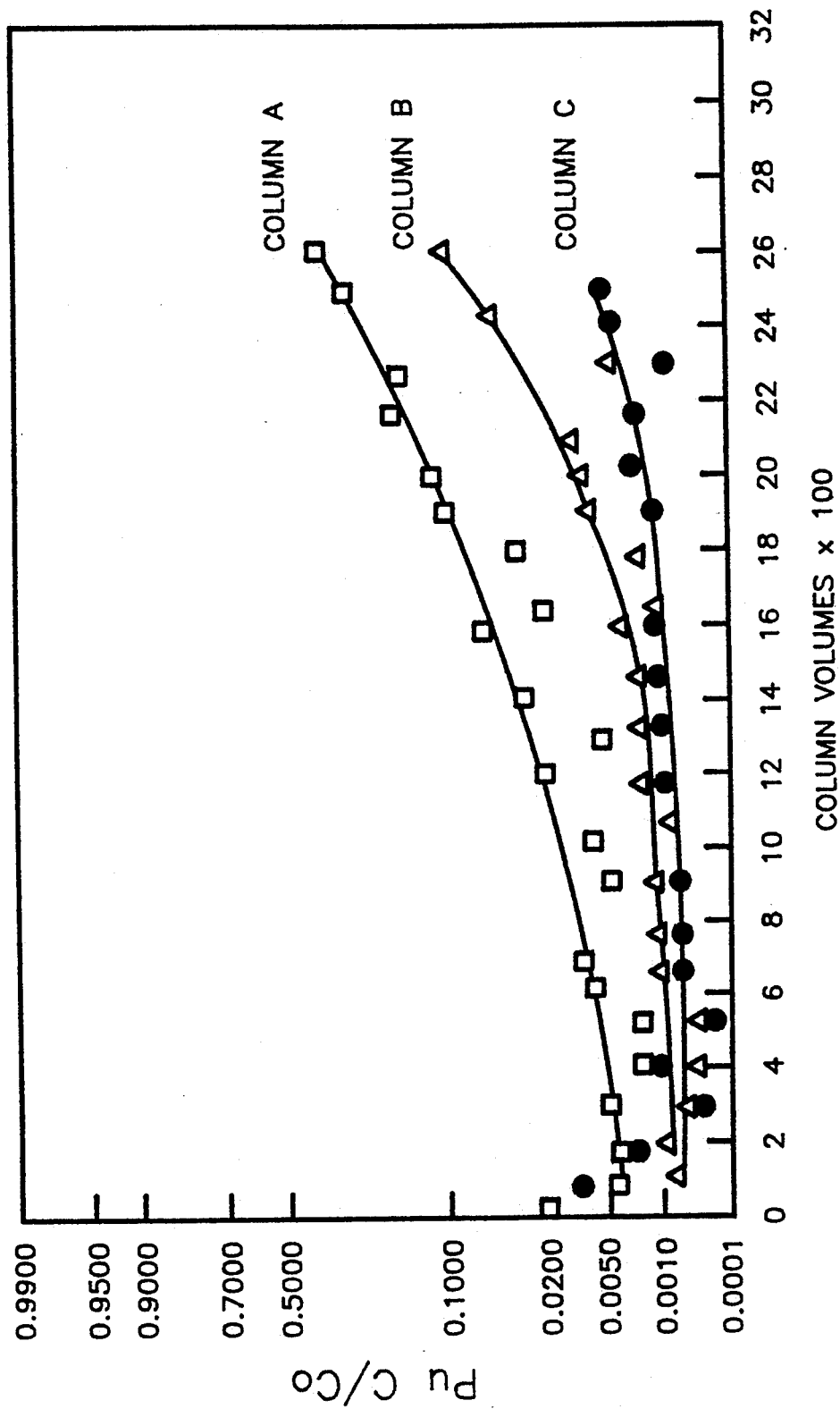
FIG. 2 is a graph showing recovery of plutonium from synthetic alkaline waste using titanium-treated zeolite ion exchanger (5.3 wt % $TiO_2$).

Synthetic West Valley (WV) alkaline supernatant (6.4M $Na^+$) was prepared and diluted to a known sodium value (2.1M $Na^+$). This was used to represent the WV alkaline feed diluted 1:3 (initial volume:final volume). The IONSIV IE-96 zeolite was purchased from the Union Carbide Corporation, Linde Division, Tarrytown, N.Y. The zeolite was treated with titanium (Ti), and batch and ion exchange column tests were performed using aqueous feeds traced with plutonium, cesium, and strontium.

A. Method for Loading Titanium on IE-96

Two initial methods, ion exchange column loading and batch treatment, have been used to load IE-96 with titanium trichloride ($TiCl_3$, 20% solution, technical grade, 500 mL, V884-7, J. T. Baker Chemical Co., Phillipsburg, N.J. 08865. This solution may contain $H_3PO_4$ to stabilize the $TiO_2$). The steps include, 1) loading $TiCl_3$ onto the dry zeolite, 2) water washing the zeolite to remove the excess $TiCl_3$, 3) air drying the zeolite to convert the $Ti^{3+}$ to $Ti^{4+}$ (optional), 4) contacting the Ti-loaded zeolite with a very dilute solution of NaOH to neutralize the acid and to hydrolyze the titanium, 5) washing the zeolite with water to remove the excess caustic and chloride ion, and 6) drying the zeolite for storage prior to use.

The titanium is loaded on the zeolite as the $Ti^{3+}$ ion. When the zeolite is caustic washed and air dried, the following reaction is assumed, $$6H_2O + 4Ti^{3+} + O_2 \rightarrow 4\,Ti(IV)O_2 + 12\,H^+.$$

The zeolite is acidic after $Ti^{3+}$ loading, washing, and air drying (3 moles $H^+$ per mole of Ti loaded). Therefore, the zeolite must be neutralized with caustic to prevent column gassing during use. The gassing is caused by carbonate in the WV supernatant reacting with the acid.

B. Batch Titanium-Treatment Method

Samples of Ti-treated zeolite were prepared by the following method:
1. Weigh out zeolite IE-96.
2. Add 20% solution of $TiCl_3$ to the dry zeolite. Blend the mixture.
3. Wash the Ti-treated zeolite with water until the chloride content in the effluent has been reduced (using $AgNO_3$ as a chloride indicator).
4. Filter the Ti-treated zeolite to remove the excess water.
5. Pass air through the filtered bed of zeolite for 24 h to dry the exchanger and to convert the $Ti^{3+}$ ion to $Ti^{4+}$ and to dry the zeolite (optional).
6. Re-saturate the Ti-treated zeolite with water.
7. Slowly pass a dilute solution (0.1M solution of NaOH) through the bed until the acid is neutralized. Use an ion exchange column to do this step.
8. Wash the caustic out of the bed with water.
9. Pull air through the bed to dry.

C. Batch Treatment to Vary the wt % $TiO_2$

Samples of Ti-treated zeolite were prepared by the following method to vary the wt % $TiO_2$ and to address concerns about heating the treated zeolite at UOP during the manufacturing step.
1. Take 5 g of IE-96. Use Fisher-stabilized 20% $TiCl_3$ (technical grade) (Fisher or equivalent).
2. Contact with:

| Sample No. | 20% $TiCl_3$ | $H_2O$ |
|---|---|---|
| E | 0.5 mL | 1.5 mL |
| F | 1.0 mL | 1.0 mL |
| G | 1.5 mL | 0.5 mL |
| H | 2.0 mL | 0 mL | for 24 h.
3. Wash each sample with $H_2O$.
4. Wash with 5 mL portions of 0.1M NaOH to bring the pH to 11. Test for chloride using acidified $AgNO_3$.
5. Wash each batch twice with 5 mL of $H_2O$.
6. Sample for $TiO_2$.
7. Air dry each batch for 24 h.
8. Take ½ of each batch to 115° C. for two hours.
9. Weigh out 0.1 g samples of air-dried and 115° C. heated zeolite for batch distribution tests using 25° C. and 6° C., 48 h contact time, single batch analysis, plutonium and cesium, at pH 9.1 and 12.5.

II. Batch Distribution Studies Using Ti-Zeolite

Methods were investigated for the simultaneous recovery of plutonium, cesium, and strontium from sludge wash solutions. Manufacturing options for the preparation of the zeolite were investigated to determine the effect of varying the titanium loading and drying the zeolite at 115° C.

A. Effect of pH, Temperature, and Caustic Treatment

The Ti-treated zeolite was prepared by batch loading IE-96 with $TiCl_3$, washing the excess Ti from the zeolite using water, and drying the material prepared by the Batch Ti-Treatment method described in Section I.B, above. The acidic zeolite was neutralized with 0.1M NaOH, water washed, and dried. Cesium, strontium, and plutonium batch distribution values were first obtained at pH values of 10 and 12.5 (6° C. and 25° C.). The results are summarized in Table 1 (at back of specification) as distribution values ($R_d$) under conditions tested.

The batch distribution values are shown in Table 2 (at back of specification). The cesium $R_d$ values are reduced by 20% at a zeolite loading of 4% $TiO_2$ as compared to uncoated zeolite. As the temperature was reduced from 25° C. to 6° C., the cesium $R_d$ values increased 60%. The plutonium $R_d$ decreased to 10% (pH 10) and 30% (pH 12) of that found at 25° C.

2. Effect of Titanium Concentration

After completion of the initial study described above, four additional Ti-treated zeolite samples were prepared by varying the addition of $TiCl_3$ (Section I.C, above). The samples were batch washed with 0.1M NaOH, water washed, and air-dried. To increase the drying temperature, one-half of each sample was dried at 115° C. Cesium and plutonium batch distribution values were then obtained at a pH of 9.1 and 12.5 (6° C. and 25° C.) using "as received 0.28 wt % $TiO_2$"; IE-96, air dried Ti-treated IE-96, and 115° C. dried Ti-treated zeolite.

The results are found in Table 3. At $TiO_2$ loadings greater than 1.5 wt %, the large plutonium $R_d$ values appear similar at a pH of 12.5. This is due to the uncertainty of the plutonium values remaining in the aqueous phase after contact (nearing counting background). No adverse effect was found for the plutonium $R_d$ values after drying the sample at 115° C., as compared to air drying the Ti-treated zeolite.

III. Ion Exchange Column Studies Using Ti-Zeolite

Multiple column plutonium recovery studies were completed to test the Ti-treated zeolite concept. The columns each had a capacity of 2 mL of exchanger to accommodate the limited volume of actual waste available at West Valley (WV). The same column design could then be used to confirm the results using actual wastes versus synthetic feeds. The results show that Ti-treated zeolite will effectively remove plutonium from solution.

A. Ion Exchange—5.3 wt % $TiO_2$ Using Synthetic Feed

Studies were completed using a three column series, each containing 2 mL of 5.3 wt % $TiO_2$ prepared using $TiCl_3$. At the completion of 2600 cv through columns A, B, and C, plutonium breakthrough values of 40%, 12%, and 9%, respectively, were observed. Column A was nearing 2700 cv at 50% C/Co using 5.3% $TiO_2$ versus 375 cv for 1.3 wt % $TiO_2$.

B. Ion Exchange—5 wt % $TiO_2$ Using Actual WV Waste

Figure 3:
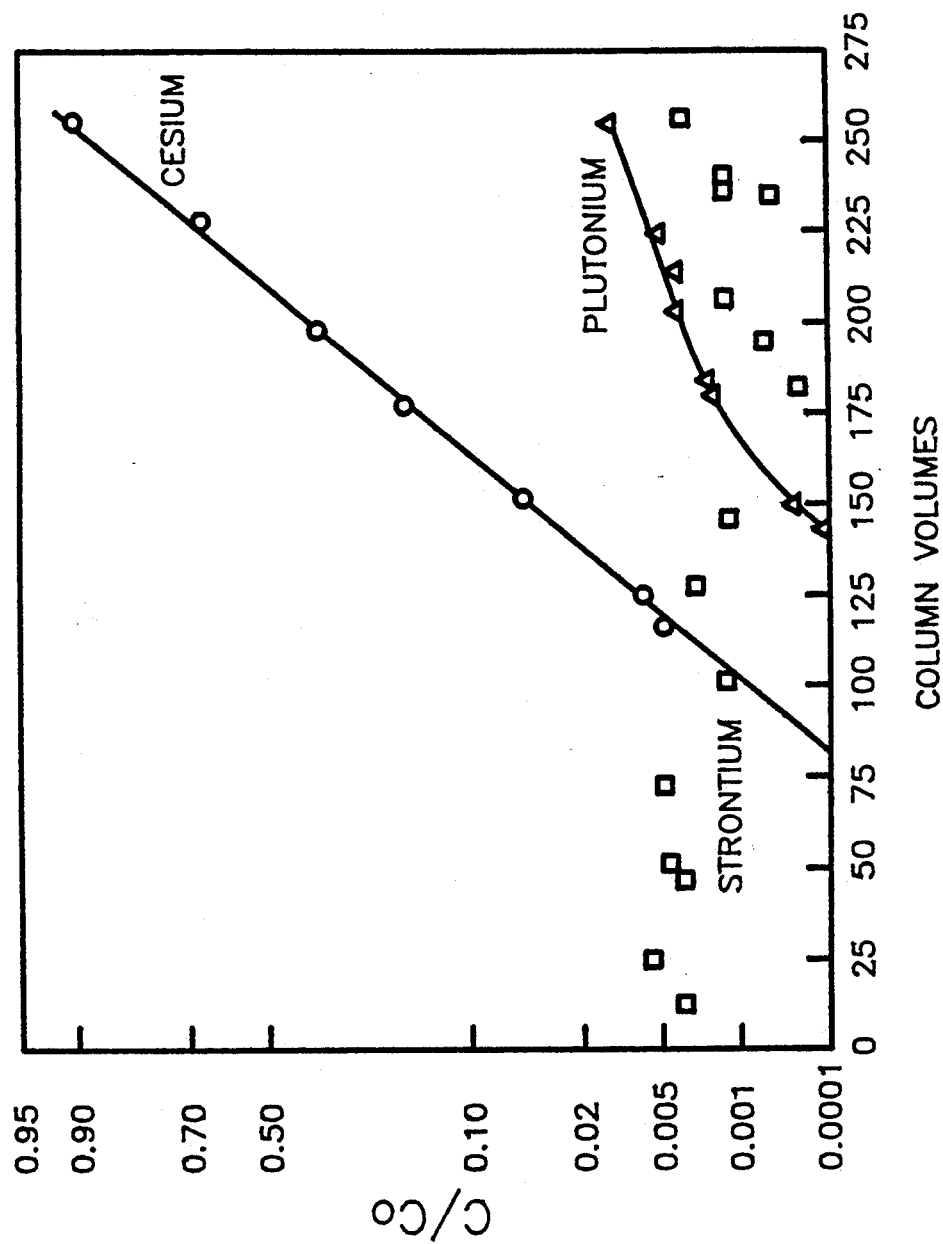
FIG. 3 is a graph showing recovery of cesium, strontium and plutonium from actual West Valley waste using a single column of titanium-treated zeolite ion exchanger (5 wt % $TiO_2$).

The ion exchange concept was tested at West Valley using a single ion exchange column filled with 2 mL of 5 wt % $TiO_2$, produced commercially by UOP. Actual WV waste (Sludge Wash #2) was passed through the column. The results are shown in FIG. 3. This test proved the use of IE-96 for multiple column service at West Valley, for the recovery of cesium, strontium, and plutonium.

While the preferred embodiment of the present invention has been shown and described, it will be apparent to those skilled in the art that many variations can be made within the broad scope of the invention. The appended claims are intended to cover all such variations within the scope of the invention appropriately interpreted in accordance with the doctrine of equivalents.

TABLE 1

Conditions and Results After Testing Ti-Zeolite
(Results Shown are Based on Table 2)

| Conditions Tested | | Ratios ($R_d \div R_d$) | | |
|---|---|---|---|---|
| | | Cs | Pu | Sr |
| Coated ÷ Uncoated | | | | |
| pH 10 | 25° C. | 0.84 | 62 | 32 |
| | 6° C. | 0.81 | 15 | 25 |
| pH 12 | 25° C. | 0.83 | 6 | 2.4 |
| | 6° C. | 0.81 | 5 | 15 |
| 6° C. ÷ 25° C. | | | | |
| pH 10 | | 1.7 | 0.1 | 0.6 |
| pH 12 | | 1.7 | 0.3 | 0.6 |

The formula for the determination of $R_d$ is:

$$R_3 = C_s \div C_1, \ mL/g; \text{ where,}$$

$C_s$—the concentration of the radionuclide exchanged on the solid phase (Ci or g of radionuclide/g of anhydrous zeolite), $C_1$—the concentration of the radionuclide remaining in the liquid phase after batch contact (Ci or g of radionuclide/mL).

TABLE 2

Distribution Values for Plutonium, Cesium,
and Strontium as a Function of Temperature
Objective: To determine the distribution value[a] as a
function of temperature and pH. To compare distribution
values using untreated zeolite.
Batch A = 4.0 wt % as $TiO_2$
Contact Time: 48 hours
Zeolite Preparation Method: See I.2

| | pH Adusted | | Uncoated IE-96 | |
|---|---|---|---|---|
| Initial pH | Batch A $R_d$ | Final pH | $R_d$ | Final pH |
| Temperature: 25° C. | | | | |
| Cs | | | | |
| 10 | 153 | 9.1 | 182 | 9.1 |
| 12.5 | 131 | 12.4 | 157 | 12.6 |
| Sr | | | | |
| 10 | 279 | 9.1 | 8.6 | 9.1 |
| 12.5 | 1,958 | 11.1 | 808 | 12.4 |
| Pu | | | | |
| 10 | 1,364 | 9.2 | 22 | 9.1 |
| 12.5 | 6,913 | 11.1 | 1,152 | 12.4 |
| Temperature: 6° C. | | | | |
| Cs | | | | |
| 10 | 256 | 9.0 | 315 | 9.1 |
| 12.5 | 222 | 12.3 | 274 | 12.3 |
| Sr | | | | |
| 10 | 152 | 9.1 | 6 | 9.2 |
| 12.5 | 1,144 | 11.1 | 76 | 12.2 |
| Pu | | | | |
| 10 | 117 | 9.1 | 8 | 9.2 |
| 12.5 | 1,949 | 11.1 | 402 | 12.3 |

[a] Distribution values reported below are an average of two determinations.

TABLE 3

Plutonium and Cesium Batch Distribution Values as
a Function of pH, Temp., and Wt % $TiO_2$ Zeolite
Preparation Method (I.3)
Objective: Prepare a series of four Ti-treated zeolite
samples by varying the addition of $TiCl_3$. Wash the excess
$TiCl_3$ out of the zeolite and save the waste for analysis.
Batch wash the Ti-coated zeolite using $0.1\underline{M}$ NaOH until the
pH is 10. Batch wash the zeolite with 2 cv of $H_2O$ and air
dry. Dry ½ of the coated material at 115° C. Repeat
batch distribution values for air and 115° C. dried zeolite
as a function of the available Ti concentration.

| Wt % $TiO_2$ | Temperature: 25° C. | | | | | Temperature: 6° C. | | | |
|---|---|---|---|---|---|---|---|---|---|
| | # | Pu $R_d$ | pH | Cs $R_d$ | pH | # | Pu $R_d$ | pH | Cs $R_d$ | pH |
| Final pH 12.5 | | | | | | | | | | |
| 0.28 | — | 1075 | 12.5 | 193 | 12.3 | — | 757 | 12.5 | 306 | 12.4 |
| IE-96 | — | 1152 | 12.4 | 157 | 12.6 | — | 402 | 12.3 | 274 | 12.3 |
| 1.6 | o | 2665 | 12.4 | 174 | 12.5 | o | 543 | 12.4 | 250 | 12.5 |
| (E) | a | 3523 | 12.4 | 180 | 12.5 | a | 3123 | 12.4 | 228 | 12.5 |
| 2.7 | o | 4009 | 12.4 | 168 | 12.5 | o | 2688 | 12.3 | 248 | 12.5 |
| (F) | a | 3332 | 12.4 | 142 | 12.5 | a | 3250 | 12.3 | 227 | 12.5 |
| 3.9 | o | 4151 | 12.4 | 149 | 12.4 | o | 2203 | 12.4 | 160 | 12.5 |
| (G) | a | 4819 | 12.4 | 127 | 12.4 | a | 4003 | 12.4 | 161 | 12.5 |
| 4.7 | o | 3692 | 12.3 | 116 | 12.4 | o | 3099 | 12.3 | 185 | 12.5 |
| (H) | a | 5041 | 12.3 | 131 | 12.4 | a | 4895 | 12.3 | 183 | 12.5 |
| Final pH 9.1 | | | | | | | | | | |
| 0.28 | — | — | — | — | — | — | — | — | — | — |
| IE-96 | — | 22 | 9.1 | 182 | 9.1 | — | 8 | 9.2 | 315 | 9.1 |
| 1.6 | o | 264 | 9.1 | 189 | 9.2 | o | 58 | 9.1 | 313 | 9.1 |
| (E) | a | 207 | 9.1 | 185 | 9.2 | a | 44 | 9.1 | 288 | 9.1 |
| 2.7 | o | 403 | 9.1 | 178 | 9.1 | o | 93 | 9.2 | 278 | 9.2 |
| (F) | a | 300 | 9.1 | 167 | 9.1 | a | 73 | 9.2 | 274 | 9.2 |
| 3.9 | o | 533 | 9.1 | 168 | 9.2 | o | 123 | 9.1 | 270 | 9.2 |
| (G) | a | 386 | 9.1 | 155 | 9.1 | a | 100 | 9.2 | 252 | 9.2 |
| 4.7 | o | 804 | 9.1 | 143 | 9.1 | o | 154 | 9.1 | 246 | 9.1 |
| (H) | a | 787 | 9.1 | 143 | 9.1 | a | 140 | 9.1 | 233 | 9.1 |

, o = oven dried at 115° C., a = air dried
$TiO_2$ values are being reconfirmed by the analytical laboratory.

We claim:

1. A method for removing plutonium, strontium, and cesium from an alkaline aqueous solution comprising contacting said solution with a titanium-treated zeolite ion exchange medium.

2. The method of claim 1 wherein said ion exchange medium contains up to about 5 weight percent titanium.

3. The method of claim 1 wherein the zeolite ion exchange medium comprises an aluminosilicate compound containing up to about 5 weight percent titanium in the form of sodium titanate.

4. The method of claim 1 including the step of adding titanium trichloride in aqueous solution to said zeolite in an amount sufficient to comprise up to about 5 weight percent of said zeolite, contacting said zeolite with aqueous sodium hydroxide to convert the titanium trichloride to sodium titanate, and air drying said titanium-treated zeolite prior to contacting with alkaline, aqueous solution.

5. A method for removing plutonium, strontium, and cesium from sludge and supernatant fluid fractions in high-level nuclear waste storage tanks, comprising the steps of:
 a) separating the sludge and supernatant fluid;
 b) washing the sludge with water;
 c) adjusting the pH of the supernatant fluid and the sludge wash solution to about 12.5;
 d) contacting the supernatant fluid and sludge wash solution with titanium-treated zeolite containing up to about 5 weight percent titanium in an ion-exchange column;
 e) collecting the effluent from the ion-exchange column;
 f) mixing said effluent with concrete; and
 g) storing the concrete containing the effluent as a low-level waste product.

* * * * *